Nov. 8, 1949     H. M. WILSON     2,487,683
SNAP-ACTING SPRINGING AND THERMOSTATIC PLATE
Filed May 10, 1946     2 Sheets-Sheet 1
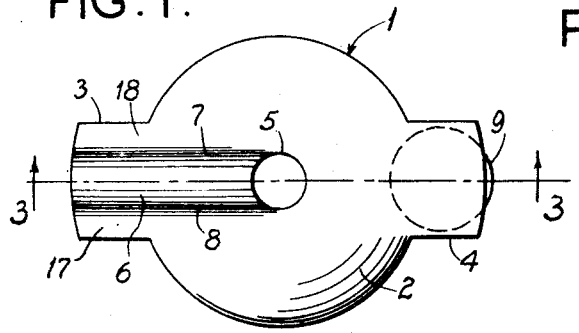
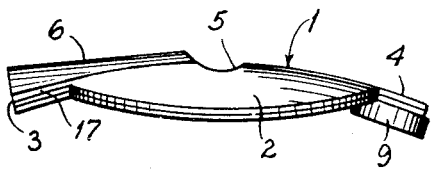
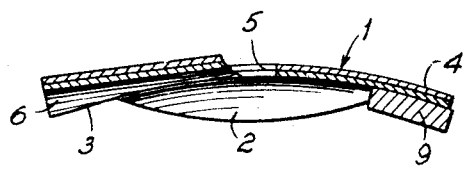
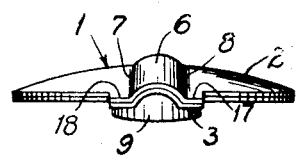
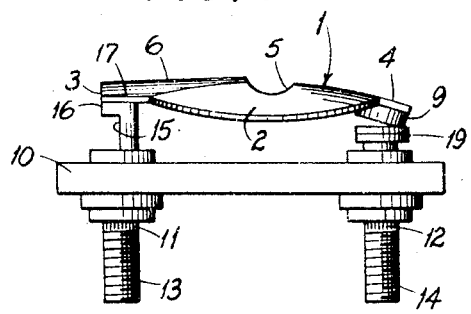
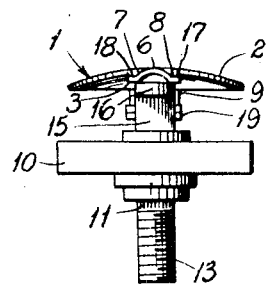
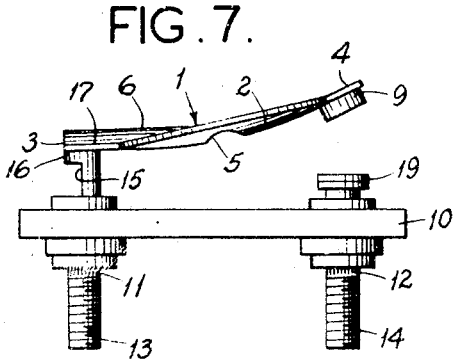
Harold M. Wilson, Inventor.
Haynes and Koenig
Attorneys.

Nov. 8, 1949 H. M. WILSON 2,487,683
SNAP-ACTING SPRINGING AND THERMOSTATIC PLATE
Filed May 10, 1946 2 Sheets-Sheet 2
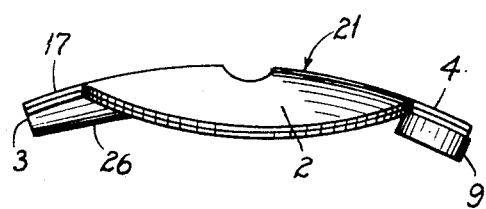
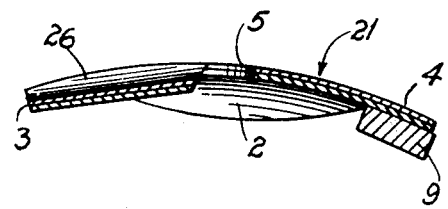
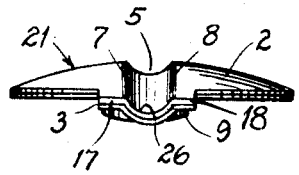
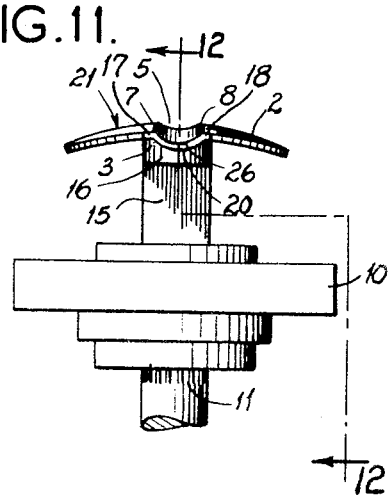
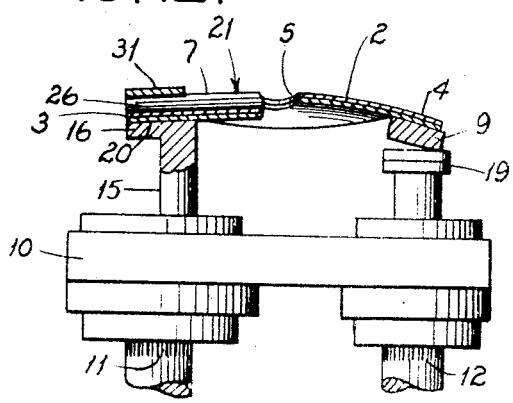

Patented Nov. 8, 1949

2,487,683

UNITED STATES PATENT OFFICE 2,487,683

SNAP-ACTING SPRINGING AND THERMOSTATIC PLATE

Harold M. Wilson, Lexington, Mass., assignor to Metals & Controls Corporation, Attleboro, Mass., a corporation of Massachusetts Application May 10, 1946, Serial No. 668,865

11 Claims. (Cl. 200—138)

This invention relates to snap-acting plates, and with regard to certain more specific features, to snap-acting control devices including inherently snap-acting temperature-responsive means, particularly adapted to operate valves, switches, and the like. The invention also relates to a method of making such plates.

Among the several objects of the invention may be noted the provision of inherently snap-acting devices, particularly thermostats, which respond to suitable actuation with an improved snap or abrupt motion, and which have a greatly increased range of usable motion; the provision of a thermostatic electric switch which is compact in structure and which, comprising only one movable part, is relatively simple and economical to construct; the provision of a thermostatic switch which is relatively simple to adjust; the provision of a thermostatic switch of the snap-acting disc type, so constructed that a much greater portion of the snap motion can be effectively utilized; the provision of a thermostatic switch which is less subject to creeping during the closed part of its cycle than hitherto known switches of like class; and the provision of a thermostatic switch which has a greater certainty of operation. Other objects will be in part obvious and in part pointed out hereinafter.

The invention accordingly consists of the elements and combinations of elements, steps and sequence of steps, features of construction and manipulation, and arrangements of parts, which will be exemplified in the accompanying drawings, and the scope of the application of which will be indicated in the following claims.

In the accompanying drawings, in which are illustrated two of various possible embodiments of the invention, Fig. 1 is a top plan view of an inherently snap-acting device of the present invention;

Fig. 2 is a side elevation of the snap-acting device of Fig. 1;

Fig. 3 is a cross section taken substantially along line 3—3 of Fig. 1;

Fig. 4 is a left-end elevation of Fig. 1;

Fig. 5 is a side elevation on a reduced scale of a thermostatic switch employing the snap-acting device of Fig. 1;

Fig. 6 is a left-end elevation of Fig. 5;

Fig. 7 is a view similar to Fig. 5 but showing an alternative position of the snap-acting element;

Fig. 8 is a view similar to Fig. 2 but showing another embodiment of the invention;

Fig. 9 is a view similar to Fig. 3 but showing said other embodiment;

Fig. 10 is a left-end view on a reduced scale of Fig. 8;

Fig. 11 is a view similar to Fig. 6 but showing the alternative form of the invention in application; and, Fig. 12 is a vertical section taken on line 12—12 of Fig. 11, but showing also the alternative use of an anchor part.

Similar reference characters indicate corresponding parts throughout the several views of the drawings.

The invention is an improvement upon the structures shown in United States Patents 1,448,240 and 2,317,831. Cross reference is hereby made under the provisions of Rule 78 to the assignee's copending application Serial No. 697,879, filed September 19, 1946, for Snap-acting springing and thermostatic plates.

The present invention applies to control devices of all types wherein it is desired that the controlling element shall move with a snap motion. Among such control devices are valves and electric switches, which constitute the more usual controlled or actuated elements falling within the scope of the invention. The invention, in principle, applies equally well to these and other types of control devices, but for purposes of description, the application of the invention to thermostatic switches will suffice.

Inherently snap-acting thermostatic plates or elements generally have the disadvantage that the available snap movement is small. In order to increase this movement, multiplying switch arms have been used, but these lead to additional cost and complexity in the device. Another solution to the difficulty has been to mount a snap-acting plate at one end thereof, and utilize the motion of an opposite end or part of the plate. This has been done both with and without restraining the motion of the central part of the snap-acting plate. Where no central restraint is used, a disadvantage is encountered, in that to adjust the thermostatic plate so as to eliminate the inherent initial creep or slow motion part of the movement of the plate, it is necessary to pre-stress the plate, generally by bending the supporting mounting. However, inasmuch as these snap-acting plates are flexible, this bending tends to strain a part of the snap-acting plate toward the opening position, and when the plate has snapped to a position of opposite curvature, it is found that a large part of the snap motion has, for useful purposes, been lost because of this strain. Where a central restraint is used, the disadvantage is that the addition of the center adjusting means leads to additional cost of manufacture, plus the further objection that, due to the clearance that must be allowed between the snap-acting plate and the shoulders of the adjusting stem to prevent binding, additional creep is allowed during the return motion of the plate, with resulting loss of usable snap motion.

By means of this invention a control device is provided (exemplified in a thermostatic switch), wherein the snap-acting plate is mounted at one end, and the other free end thereof is used for control purposes. The snap-acting plate is so formed that (1) substantial elimination of the initial creep of the plate, and (2) adjustment of the operating temperature of the snap-acting plate, are both accomplished without encountering the difficulty mentioned above in respect to pre-springing or pre-straining the snap-acting plate and thus losing useful motion, and without the additional cost of a central adjusting post.

Referring now more particularly to the drawing, numeral 1 indicates in general a permanently set dished snap-acting thermostatic plate composed of thermostatic bimetal. It comprises a round disc-shaped portion 2 having at least one projecting mounting ear 3 and it may have another ear 4. A central hole 5 is provided, if desired.

Extending from approximately the outer end of the ear 3 to approximately the center of the plate (or beyond, if desired) is a raised (or alternatively depressed) rib 6. Rib 6 serves as a stiffening element for the mounting-end portion of the snap-acting plate and in addition, tends to maintain the center of the plate in a predetermined position. In order to eliminate the initial slow motion of the element and to adjust its operating temperature, only a light bending of the mounting support need be made, and little or no canting of the plate toward the closed position is effected, since sufficient stress can now be put in the plate with little canting.

Another improvement afforded by this invention is the reduction of creep in relation to a fixed point of reference exterior of the plate.

Figs. 1-7 show a case wherein the rib is raised. Figs. 8-12 show a case wherein the rib is depressed. Either alternative will work satisfactorily.

It is to be noticed that in this snap-acting plate, a permanently set portion of the plate extending from approximately one side 7 of the rib 6 circumferentially around the plate to the other side 8 of the rib 6 is of a non-developable contour. That portion of the snap-acting plate surface which comprises the rib itself is of developable contour. The invention, therefore, provides a snap-acting plate in which the surface of the plate is partly non-developable and partly developable. The re-entrant boundary of the non-developable surface is not necessarily a sharply defined boundary. It may change gradually from its non-developable character into the developable character of the rib 6.

For the purposes of using this snap-acting plate a contact element 9 is welded to the ear 4.

Fig. 5 shows a thermostatic snap-acting switch employing the snap-acting element of Fig. 1. A base 10 of insulating material such as "Bakelite" or "micarta" is provided. Mounted adjacent to each end of the base 10 are studs 11 and 12 which project on both sides of the base 10. Studs 11 and 12 can be fastened into the base 10 by any of the means well known in the art, such as riveting or the like. These studs are made of steel, or some other metal capable of being spot welded in the usual type of spot-welding machine. The lower ends 13 and 14 respectively of studs 11 and 12 are threaded to serve as connecting terminals. The upper portion 15 of the stud 11 is reduced in cross section, as shown, by milling away a part of the stud to leave a reduced cross section at 15 which is capable of being bent. This to to provide adjustment for the snap-acting plate 1. A flat table portion 16 is preferably left on stud 11 to serve as a mounting table for the ear 3 of plate 1.

Plate 1 is mounted on table 16 by spot welding the horizontal flanges 17 and 18 of the ear 3 to the top surface of table 16. Mounted on the top end of stud 12 is a contact 19. This mounting can be accomplished either by spot welding or by soldering or brazing. The relative heights of table 16 and the top part of stud 12 are preferably so proportioned so that when plate 1 is welded to table 16, contact 9 is just touching contact 19.

In the manufacture of the assembly, the milling operation to form the reduced section 15 of stud 11 may be done after stud 11 is firmly mounted in base 10. In this way, the milling can be done in such a direction as to provide a reduced cross section in the direction in which 15 is to be bent for temperature adjustment.

After plate 1 has been mounted on stud 16, the temperature adjustment is made by bending stud 15 clockwise or anti-clockwise, as may be found necessary in order to place the proper tension in plate 1 in order to eliminate the initial creep or slow motion of the plate and to adjust the operating temperature. The amount of bending is governed by the individual characteristics of each plate.

Fig. 7 shows the position occupied by the snap-acting plate when it has operated to snap to a position of opposite curvature.

Fig. 11 shows the construction when the plate of Figs. 8-10 is used. In this case, a groove 20 is provided in table 16 to accommodate the depressed rib 26. This groove may be milled in table 16 after the stud 11 is firmly riveted into the base 10, and will then provide a locating and aligning means for plate 1. Again, the ear 3 of the plate is welded to the table 16. A contact construction similar to that above described is provided for the other end of the snap-acting plate. Similar adjusting is made in order to eliminate initial creep, and to have the plate operate at its correct temperature.

Fig. 12 is a vertical section showing the parts of Fig. 11, except that a strengthening feature has been shown. This consists in a thin disc 31 of cold rolled steel which at the time that the ear 3 is welded to the table 16 is also welded to the ear above the depressed rib 26. Thus the ribbed portion of the ear 3 is enclosed on opposite sides by welded parts.

Exemplary dimensions are a thickness of .012 inch for the disc portion 2 for a diameter of this portion of approximately .875 inch. The central hole 5 is approximately .157 inch. The widths of the ears 3 and 4 are approximately .312 inch. The inside radius of the rib in both forms of the invention (whether struck up or struck down) is approximately .032 inch. The disc 31 is approximately $\frac{1}{32}$ inch thick and ¼ inch in diameter.

These dimensions are of course subject to variation, depending upon the service to which the device is to be put.

It is clear that the snap-acting plate may be a mono-metallic snap-acting spring plate, if it is desired to construct a simple manually operable snap switch, without response to temperature. All the attendant advantages of this invention over prior art snap switches also inhere in such a construction. It is also clear that a separate reinforcing rib may be attached to the plate, as distinguished from a rib which is made an integral part of the plate as shown. This would be accomplished by welding or the like.

The advantages of the invention may also be realized, at least in part, even in a snap-acting plate which does not have ears. In such a case, the rib will preferably extend simply from the peripheral portion of the plate to a central portion thereof. The stiffening of the one side of the plate will diminish the effective creep of the disc.

The terms "developable" and "non-developable" are used herein according to their usual geometric meanings. For example, a spherical form for shape 2 is "non-developable," and a cylindric or conical form for the form 6 is "developable." There are also other known shapes in these categories but the above are sufficiently exemplary. The term "permanently set" is used herein according to the usual meaning in the field of strength of materials, meaning a permanent change in form occasioned by stressing of material beyond its elastic limit.

In making the device it is preferable that the developable surface be first formed, and thereafter the non-developable surface, because once a non-developable characteristic is imparted to a given area, it is difficult by a subsequent formation in the same area to eliminate the non-developable characteristic. It is also easier to make the non-developable form around the small channel effected by the developable form.

Figs. 5, 6, 7 and 11 (which are on a reduced scale) indicate the bimetallic structure diagrammatically as a single layer. This is simply for the purpose of simplifying these reduced-scale drawings. It is to be understood, however, that the invention is also applicable to mono-metallic discs and discs of other numbers of layers but of the same shapes as those shown.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A spring plate comprising a metallic sheet part having a non-developable surface adapted to change shape abruptly upon reaching a predetermined internal stress, said surface extending to at least a substantial portion of the edge of said plate, at least one ear formed integrally with said plate, and a reinforcing rib extending from a central portion of said plate toward the edge thereof in such position that said rib traverses at least a part of said ear.

2. A spring plate comprising a metallic sheet part having a non-developable surface adapted to change shape abruptly when at least a portion of said surface reaches a predetermined internal stress, and a developable surface in the shape of a formed rib, said rib extending from a central portion of said non-developable surface outwardly toward an edge of said plate, and at least one ear formed integrally with said plate, said rib traversing at least a portion of said ear.

3. A control device comprising a base, a snap-acting spring plate, said plate comprising a metallic sheet part having a non-developable surface adapted to change shape abruptly upon reaching a predetermined internal stress, said surface extending to at least a substantial portion of the edge of said plate, at least one ear formed integrally with said plate, and a reinforcing rib extending from a central portion of said sheet toward the edge thereof in such position that said rib traverses at least part of said ear, said plate being mounted on said base, and control means actuated by another portion of said plate.

4. A control device comprising a base, mounting means on said base, a spring plate, and other means controlled by said spring plate, said spring plate having a metallic sheet part having a non-developable surface adapted to change shape abruptly when at least a portion of said surface reaches a predetermined internal stress, and having a developable surface in the shape of a formed rib, said developable surface being bounded, at least in part, by a re-entrant portion of the periphery of said non-developable surface and at least one ear formed integrally with said plate, said rib including at least a portion of said ear, said spring plate being mounted on said base by attaching said ear to said mounting means, and said other means being controlled by the motion of a portion of said plate remote from said ear.

5. A thermostatic control device comprising a base, mounting means on said base, a thermostatic plate, and other means controlled by said thermostatic plate, said thermostatic plate comprising a composite thermostatic sheet having a non-developable surface adapted to change shape abruptly upon reaching a predetermined temperature, and a developable surface in the shape of a formed rib, said rib extending from a central portion of said non-developable surface outwardly toward an edge of said plate, and at least one ear formed integrally with said plate, said rib including at least a portion of said ear, said thermostatic plate being mounted on said base by attaching said ear to said mounting means, and said other means being controlled by motion of a portion of said plate remote from said ear.

6. A switch comprising a base, a mounting means on said base, a spring plate, a contact actuated by said plate, and a cooperating contact mounted on said base, said spring plate comprising a metallic sheet part having a non-developable surface adapted to change shape abruptly when at least a portion of said plate reaches a predetermined internal stress, and a developable surface in the shape of a formed rib, said rib extending from a central portion of said non-developable surface outwardly toward an edge of said plate, and at least one ear formed integrally with said plate, said rib including at least a portion of said ear, said plate being mounted on said base by attaching said ear to said mounting means.

7. A switch comprising a base, a spring plate, a contact actuated by said plate, and a cooperating contact mounted on said base, said plate comprising a metallic sheet part having a non-developable surface adapted to change shape abruptly upon reaching a predetermined internal stress, said surface having a periphery of which a portion is re-entrant, at least one ear formed integrally with said plate, and a reinforcing rib contiguous with the re-entrant periphery of said non-developable surface, in such position that said rib traverses at least part of said ear, said plate being mounted on said base by attaching said ear to said base.

8. A thermostatic switch comprising a base, a thermostatic plate, a contact actuated by said plate, and a cooperating contact mounted on said base, said plate comprising a composite thermostatic sheet part having a non-developable surface adapted to change shape abruptly upon reaching a predetermined temperature, and a developable surface in the shape of a formed rib, said rib extending from a central portion of said plate outwardly toward an edge of said plate, and at least one ear formed integrally with said plate, said rib including at least a portion of said ear, said plate being mounted on said base by attaching said ear to said base.

9. A thermostatic switch comprising a base, a stud mounted on said base, a thermostatic plate, a contact carried by said plate and cooperating with a contact mounted on said base, said plate comprising a sheet of composite thermostatic metal having a non-developable surface and at least one ear formed integrally with said plate, and reinforming means for stiffening said ear and a portion of said plate, said means comprising a rib formed integrally in said ear and plate by crimping at least a portion of said ear and plate to form a trough-like channel extending across said ear and toward a central portion of said plate, said plate being mounted on said base by attaching said ear to said stud, and means for adjusting the operating temperature of said plate.

10. A thermostatic switch comprising a base, a stud mounted on said base, a thermostatic plate, a contact carried by said plate and cooperating with a contact mounted on said base, said plate comprising a sheet of composite thermostatic metal having a non-developable surface and at least one ear formed integrally with said plate, and reinforcing means for stiffening said ear and a portion of said plate, said means comprising a rib formed integrally in said ear and plate by crimping at least a portion of said ear and plate to form a trough-like channel extending across said ear and toward the center of said plate, said plate being mounted on said base by attaching said ear to said stud, and means for adjusting the operating temperature of said plate, said means comprising a cut-away portion of said stud which permits bending of said stud.

11. A snap-acting element comprising a permanently set dished metallic disc having at least one outwardly projecting ear and a central hole, and an integral stiffening rib formed of the material of the disc and extending substantially radially from the outer edge of the ear to the central hole, the disc being inherently snap-acting and capable of retaining a dished shape independently of the effect of the rib.

HAROLD M. WILSON.

REFERENCES CITED

The following references are of record in the file of this patent:

UNITED STATES PATENTS

| Number | Name | Date |
|---|---|---|
| 1,895,591 | Spencer | Jan. 31, 1933 |
| 1,895,592 | Spencer | Jan. 31, 1933 |
| 1,988,345 | Vaughn | Jan. 15, 1935 |
| 2,157,560 | Neece | May 9, 1939 |
| 2,258,875 | Arras | Oct. 14, 1941 |
| 2,264,902 | Hill | Dec. 2, 1941 |
| 2,299,562 | Burch | Oct. 20, 1942 |
| 2,317,831 | Vaughan et al. | Apr. 27, 1943 |
| 2,340,615 | Rath | Feb. 1, 1944 |
| 2,363,280 | Arnold | Nov. 21, 1944 |